3,218,311
WATER-INSOLUBLE DISAZO DYES

Willy Forter, Allschwil, Basel-Land, and Fritz Kehrer, Basel, Switzerland, assignors to Sandoz Ltd., also known as Sandoz A.G., Basel, Switzerland
No Drawing. Filed Dec. 10, 1962, Ser. No. 243,618
Claims priority, application Switzerland, Dec. 21, 1961, 14,763/61
5 Claims. (Cl. 260—161)

It has been found that water-insoluble disazo dyes of the general formula

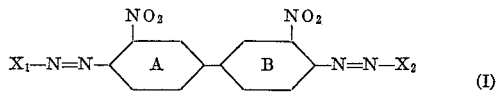

have particularly good fastness properties. In this formula $X_1$ and $X_2$ represent the radicals of the following coupling components: An acetoacetylaminobenzene, acetoacetylaminonaphthalene or acetoacetylaminoalkane, a 2-hydroxynaphthalene-3-carboxylic acid amide or a 1-arylpyrazolone. The rings A and/or B may contain further non-water-solubilizing substituents.

The new dyes are obtained when one mole of a tetrazotized diamine of the general formula

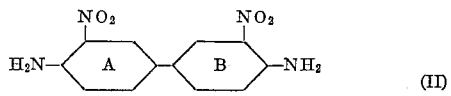

is reacted with two moles of an acetoacetylaminobenzene, acetoacetylaminonaphthalene or acetoacetylaminoalkane, a 2-hydroxynaphthalene-3-carboxylic acid amide or a 1-arylpyrazolone or a mixture of these compounds. All the reactants are free from water-solubilizing groups. Tetrazotized diamines of the general formula

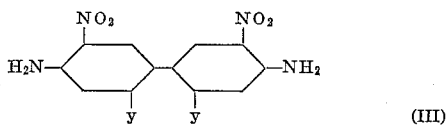

in which Y represents a hydrogen atom or halogen atoms, preferably chlorine or bromine atoms, are preferred. They yield dyes of the general formula

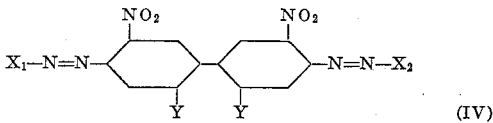

4,4' - diamino - 3,3'-dinitrodiphenyl and 4,4'-diamino-2,2'-dichloro-5,5'-dinitrodiphenyl are known ("Annalen Chimica Acta," vol. 2, pages 402–408 (1948) and German Patent 229,029). They can be tetrazotized with nitrosylsulfuric acid by the normal methods, for example as given in "Grundlegende Operationen der Farbenchemie" by Fierz-David and Blangey, fifth impression, page 236 (1943).

The coupling reaction can be conducted in a weakly acid, neutral or alkaline aqueous solution, within the pH region of about 3.5 to 11.5. The addition of pyridine is often beneficial. Coupling can however be carried out in other solvents, e.g. pyridine, dioxane or mixtures of organic solvents.

In the acetoacetylaminobenzenes employed as coupling components the benzene radical may be substituted by non-water-solubilizing substituents, e.g. halogen atoms, alkyl, alkoxy, amino, carbonamide, carbonester, sulfonamide, nitro, cyano, trifluoromethyl or alkyl- or arylsulfonyl groups in which the alkyl radicals contain e.g. 1 to 6 or preferably 1 to 2 carbon atoms. The amino groups may be acylated and the amidohydrogen atoms may be substituted. In the acetoacetylaminonaphthalenes the acetoacetylamino group may occupy either the α- or the β-position of the naphthalene ring, and this ring may be further substituted, e.g., by halogen, alkyl or alkoxy. The alkane radicals in the acetoacetlyaminoalkanes contain preferably 1 to 5 carbon atoms and may be straight or branched.

In the 2-hydroxynaphthalene-3-carboxylic acid amides the amidohydrogen atoms can be replaced. Among these are numbered, for example, the carboxylic acid anilide and carboxylic acid naphthanilide groups. Pyrazolones which are particularly advantageous for use are the 5-pyrazolones substituted in the 1-position by aryl radicals and in the 3-position by carbonamide, carbonester, alkyl or substituted alkyl groups, such as trifluoromethyl groups.

All these azo components can bear in aryl radicals and preferably in phenyl radicals water-insoluble substituents, e.g. halogen atoms or cyan, nitro, alkyl, alkoxy, carbonester, carbonamide or acylamino groups, e.g., the acetylamino or benzoylamino group.

The new dyes can be converted into pigment pastes by physical treatment, e.g., grinding in ball or roller mills, if necessary in the presence of dispersing agents, e.g., condensation products of naphthalenesulfonic acids and formaldehyde. The pigment pastes can be employed in this form, or they can be dried and the resulting powders ground. The new pigments are virtually insoluble in the commonly used solvents. They are suitable, for example, for dyeing paper pulp, drying oils or natural and synthetic resins, plastics and rubber, either undissolved or in solution and for printing textiles and papers. The colorations produced in these materials are outstandingly fast to light and have good to very good fastness to washing, chlorine bleaching, hypochlorite bleaching, peroxide bleaching, cross-dyeing, blind vatting, hydrosulfite, dry cleaning, rubbing migration, top surface coatings, and solvents, and notably good transparency and heat resistance.

In the following examples the parts and percentages are by weight and the temperatures in degrees centigrade.

Example 1

27.4 parts of 4,4' - diamino - 3,3'-dinitrodiphenyl are entered at 0–5° into a nitrosylsulfuric acid prepared with 100 parts of concentrated sulfuric acid and 14 parts of sodium nitrite. After about 3 hours the solution is poured onto 300 parts of ice. A slight excess of nitrite is removed with amidosulfonic acid, and the solution filtered. The clear, pale yellow solution thus obtained is added to a fine acetic acid suspension of 41.4 parts of 1-acetoacetylamino-2-methoxybenzene at 10–15°, the pH value being kept between 3.5 and 4.5 during the addition. On completion of coupling the mass is heated to 90°, and the pigment filtered off and washed free of salt. The pigment colors polyvinyl chloride in yellow shades of good light and migration fastness.

Other yellow pigments which are suitable for coloring polyvinyl chloride in the mass can be obtained by using in place of 1-acetoacetylamino-2-methoxybenzene the equimolecular amount of one of the following:

1-acetoacetylamino-2-ethoxybenzene,
1-acetoacetylamino-4-methoxybenzene,
1-acetoacetylamino-4-ethoxybenzene,
1-acetoacetylamino-2-methoxy-5-ethylbenzene,
1-acetoacetylamino-2,5-diethoxybenzene,
1-acetoacetylamino-2-methylbenzene,
1-acetoacetylamino-2,4-dimethylbenzene or
1-acetoacetylamino-benzene.

*Example 2*

54.3 parts of 1 - acetoacetylamino - 2,5 - dimethoxy-4-chlorobenzene are dissolved in 1000 parts of water and 22 parts of 30% sodium hydroxide solution. The solution is filtered and with vigorous stirring a mixture of 13 parts of glacial acetic acid and 100 parts of water is added, followed by a solution of 60 parts of crystallized sodium acetate in 100 parts of water. A tetrazo solution prepared according to the particulars of Example 1 with 27.4 parts of 4,4'-diamino-3,3'-dinitrodiphenyl is added. The pH value is kept at between 4.8 and 5.2 by adding 15% sodium hydroxide solution. The coupling temperature is 20°. On completion of coupling the mass is heated to 90°, and the dye filtered off and washed.

0.1 part of the disazo dye thus obtained is pasted with 0.2 part of a high-molecular plasticizer for polyesters, e.g. Paraplex 53 (Rohm & Haas, Philadelphia) ground on a grinding machine and mixed with 100 parts of plasticized polyvinyl chloride. The colored mass is gelatinized on a roller mill at about 150–160° for 10 minutes with friction, and the film drawn off with slight friction or at synchronized roller speeds. The yellow-colored polyvinyl chloride film is fast to light and outstandingly fast to migration.

Equally good results are obtained when the 1-acetoacetylamino - 2,5-dimethoxy-4-chlorobenzene is replaced by the equimolecular amount of 1-acetoacetylamino-4-chlorobenzene,
1-acetoacetylamino-2-methoxy-4-chlorobenzene,
1-acetoacetylamino-3-chloro-4-methylbenzene,
1-acetoacetylamino-2-methyl-3-chlorobenzene,
1-acetoacetylamino-2-methyl-6-chlorobenzene,
1-acetoacetylamino-2,4-dimethoxy-5-chlorobenzene,
1-acetoacetylamino-2-methoxy-4-chloro-5-methylbenzene,
1-acetoacetylamino-2-methoxy-4,5-dichlorobenzene,
1-acetoacetylamino-2,5-dimethoxy-4-fluorobenzene,
1-acetoacetylamino-2,5-dimethoxy-4-cyanobenzene,
1-acetoacetylamino-2,5-dimethoxy-4-nitrobenzene,
1-acetoacetylamino-2-methoxy-4-acetylaminobenzene,
1-acetoacetylamino-2,4,5-trichlorobenzene,
1-acetoacetylamino-2,6-dibromo-4-nitrobenzene or
1-acetoacetylamino-2,5-dimethyl-3,6-dichlorobenzene.

The 4,4'-diamino-3,3'-dinitrodiphenyl used can be obtained as follows:

67 parts of diacetylbenzidine are entered in 6 minutes into a well stirred mixture of 500 parts of 95% nitric acid and 72 parts of acetic anhydride at −10°. The whole is poured onto ice, and the product filtered off and saponified with 50% sulfuric acid.

*Example 3*

34.3 parts of 4,4'-diamino-2,2'-dichloro-5,5'-dinitrodiphenyl are tetrazotized according to the particulars of Example 1, and the filtered, buffered tetrazo solution combined with a solution of 54.3 parts of 1-acetoacetylamino-2,5-dimethoxy-4-chlorobenzene in pyridine. The pigment is filtered off, washed free of salt and dried. It is of brown color, of high tinctorial strength, and has excellent fastness to light and migration.

1 part of the pigment thus obtained is ground with 1 part of tricresyl phosphate on a color grinding machine. 1 part of the resulting paste is mixed with 4 parts of ethyl cellulose N 14 (Hercules Powder Company) and stirred into a solvent mixture consisting of 50 parts of methyl isobutyl ketone, 40 parts of ethyl acetate and 10 parts of n-butyl alcohol. The ethyl cellulose lacquer is thinned to spraying consistency and applied to sheet aluminum or chromo paperboard.

The 1 - acetoacetylamino-2,5-dimethoxy-4-chlorobenzene can be replaced by an equimolecular amount of one of the following compounds with good results:

1-acetoacetylamino-3-trifluoromethylbenzene,
1-acetoacetylamino-4-methylsulfonyl-benzene,
1-acetoacetylamino-2-methoxy-5-trifluoromethylbenzene,
1-acetoacetylamino-2-chloro-5-trifluoromethylbenzene,
1-acetoacetylamino-3-trifluoromethyl-4-chlorobenzene,
1-acetoacetylamino-3-trifluoromethyl-4-nitrobenzene,
1-acetoacetylamino-3,5-bis-(trifluoromethyl)-benzene,
1-acetoacetylamino-2,5-dimethoxy-4-methylsulfonylbenzene,
1-acetoacetylamino-4-benzoylaminobenzene,
1-acetoacetylamino-4-acetylaminobenzene,
1-acetoacetylamino-2,5-dimethoxy-4-benzoylaminobenzene,
1-acetoacetylamino-2,5-diethoxy-4-benzoylaminobenzene,
1-acetoacetylamino-2-methyl-4-acetylamino-5-methoxybenzene or
1-acetoacetylamino-2-methoxy-5-chloro-4-acetylaminobenzene.

*Example 4*

27.1 parts of 1 - acetoacetylamino - 2,5 - dimethoxy-4-chlorobenzene and 23.7 parts of 1-acetoacetylamino-2,5-dimethoxybenzene are dissolved in 1000 parts of water and 22 parts of 30% sodium hydroxide solution. The filtered solution and a buffered tetrazo solution prepared with 43.2 parts of 4,4'-diamino-2,2'-dibromo-5,5'-dinitrodiphenyl according to the particulars of Example 1 are simultaneously run into a solution of 60 parts of crystallized sodium acetate in 1000 parts of water at 20°. On completion of coupling the mass is heated to 90° and the product filtered off and washed free of salt. On conversion into a pigment preparation it dyes viscose in the mass in brown shades.

*Example 5*

A tetrazo solution of 27.4 parts of 4,4'-diamino-3,3'-dinitrodiphenyl prepared according to the procedure of Example 1 and buffered with sodium acetate is added to a mixture of 27.6 parts of 1-acetoacetylamino-2-methoxybenzene and 11.8 parts of 1-acetoacetylaminobenzene dissolved in 500 parts of dioxane. The procedure of Example 1 is performed to give a yellow pigment which, upon conversion into a pigment preparation, is suitable for the spin-dyeing of cellulose acetate. The following coupling components can be employed in the same way:

1-acteoacetylaminobenzene-4-carboxylic acid amide,
1-acetoacetylaminobenzene-4-carboxylic acid methyl ester,
1-acetoacetylaminobenzene-2-methoxybenzene-5-carboxylic acid phenyl amide,
1-acetoacetylaminobenzene-2,5-dimethoxybenzene-4-sulfonic acid amide,
1-acetoacetylaminobenzene-2,5-dimethoxybenzene-4-sulfonic acid phenyl amide.

*Example 6*

27.4 parts of 4,4' - diamino - 3,3'-dinitrodiphenyl are tetrazotized according to the procedure of Example 1. The filtered tetrazo solution is combined with a solution of 40.8 parts of 1-(4'-methoxy)-phenyl-3-methyl-5-pyrazolone in 2000 parts of water and 300 parts of 30% sodium hydroxide solution. The temperature is maintained at 10° by adding 1000 parts of ice. On completion of the coupling reaction the mass is made acid to Congo paper, heated to 80–90°, and the pigment filtered off, washed free of salt and dried. It is of high tinctorial value and dyes polyvinyl chloride in red shades.

In the same way coupling can be carried out, for example, with the following pyrazolones:

1-phenyl-3-methyl-5-pyrazolone,
1-(3'-chloro)-phenyl-3-methyl-5-pyrazolone,
1-(3'-cyano)-phenyl-3-methyl-5-pyrazolone,
1-(2'-methyl)-phenyl-3-methyl-5-pyrazolone,
1-(4'-methyl)-phenyl-3-methyl-5-pyrazolone,
1-phenyl-5-pyrazolone-3-carboxylic acid ethyl ester,
1-phenyl-5-pyrazolone-3-carboxylic acid methyl ester,
1-phenyl-5-pyrazolone-3-carboxylic acid amide,
1-phenyl-5-pyrazolone-3-carboxylic acid phenyl amide.

*Example 7*

34.3 parts of 4,4'-diamino-2,2'-dichloro-5,5'-dinitrodiphenyl are tetrazotized in the manner described in Example 1, and the tetrazo compound coupled with 40.8 parts of 1-(2'-methoxy)-phenyl-3-methyl-5-pyrazolone. The resulting pigment colors lacquer media in red shades.

*Example 8*

27.4 parts of 4,4'-diamino-3,3'-dinitrodiphenyl are tetrazotized as described in Example 1. The tetrazo solution is filtered and added to a solution of 71.5 parts of 2-hydroxynaphthalene-3-carboxylic acid-(2',4'-dimethoxy-5'-chloro)-phenylamide in 1000 parts of water, 500 parts of methyl alcohol and 50 parts of 30% sodium hydroxide solution at 10°. At the same time 600 parts of 30% sodium hydroxide solution are dropped in to maintain a constant pH value of 11.8. When coupling is complete the precipitated pigment is isolated and washed until of neutral reaction. It dyes paper in the pulp in violet shades.

In an analogous manner coupling can be carried out e.g. with the following 2-hydroxynaphthalene-3-carboxylic acid amides:

2-hydroxynaphthalene-3-carboxylic acid phenyl amide,
2-hydroxynaphthalene-3-carboxylic-(2'-methoxy)-phenylamide
2-hydroxynaphthalene-3-carboxylic-(2',5'-dimethoxy)-phenylamide,
2-hydroxynaphthalene-3-carboxylic-(3'-nitro)-phenylamide,
2-hydroxynaphthalene-3-carboxylic-(4'-nitro)-phenylamide,
2-hydroxynaphthalene-3-carboxylic-(2',4'-dimethyl)-phenylamide,
2-hydroxynaphthalene-3-carboxylic-(2'-methyl)-phenylamide,
2-hydroxynaphthalene-3-carboxylic-(4'-chloro)-phenylamide,
2-hydroxynaphthalene-3-carboxylic-(2',5'-dimethoxy-4'-chloro)-phenylamide,
2-hydroxynaphthalene-3-carboxylic-(2'-methyl-4'-methoxy)-phenylamide,
2-hydroxynaphthalene-3-carboxylic-(2'-ethoxy)-phenylamide,
2-hydroxynaphthalene-3-carboxylic-(4'-methoxy)-phenylamide,
2-hydroxynaphthalene-3-carboxylic-(2'-methyl-4'-chloro)-phenylamide,
2-hydroxynaphthalene-3-carboxylic-(2'-methoxy-5'-chloro)-phenylamide.

*Example 9*

The tetrazo solution obtained with 34.3 parts of 4,4'-diamino 2,2'-dichloro-5,5'-dinitrodiphenyl according to the procedure of Example 1 is coupled with 58.6 parts of 2-hydroxynaphthalene-3-carboxylic acid-(2'-methoxy)-phenylamide according to the particulars given in Example 8. A pigment with excellent properties is obtained.

Having thus disclosed the invention what we claim is:

1. A water-insoluble dye of the formula

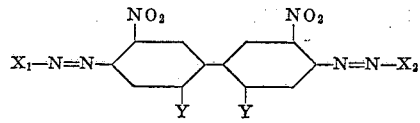

wherein:
Y is a member selected from the group consisting of hydrogen, chlorine and bromine, and
$X_1$ and $X_2$ are each 3-A-1-B-5-pyrazolone,
wherein A is a member selected from the group consisting of carboxylic acid amide, carboylic acid phenyl amide, carboxylic acid alkyl ester where alkyl contains from 1 to 2 carbon atoms, and alkyl containing from 1 to 2 carbon atoms, and
B is a member selected from the group consisting of chlorophenyl, alkylphenyl where alkyl contains from 1 to 2 carbon atoms, alkoxyphenyl wherein alkoxy contains from 1 to 2 carbon atoms and cyano.

2. A water-insoluble dye of the formula

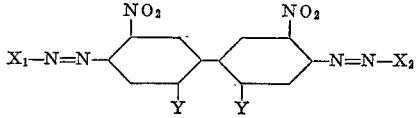

wherein:
Y is a member selected from the group consisting of hydrogen, chlorine and bromine, and
$X_1$ and $X_2$ are each a member selected from the group consisting of (a) unsubstituted 2-hydroxynaphthalene-3-carboxylic acid phenyl amide, (b) 2-hydroxynaphthalene-3-carboxylic acid phenyl amide wherein the phenyl radical contains 1 to 2 alkyl radicals having 1 to 2 carbon atoms, (c) 2-hydroxynaphthalene-3-carboxylic acid phenyl amide wherein the phenyl radical contains 1 to 2 alkoxy radicals having from 1 to 2 carbon atoms, (d) 2-hydroxynaphthalene-3-carboxylic acid phenyl amide wherein the phenyl radical contains a nitro group, and (e) 2-hydroxynaphthalene-3- carboxylic acid phenyl amide wherein the phenyl radical contains a chlorine atom.

3. A water-insoluble dye of the formula

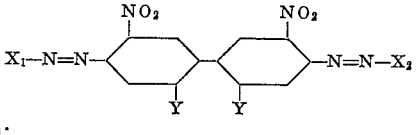

wherein:
Y is selected from the group consisting of hydrogen, bromine and chlorine;
$X_1$ and $X_2$ are each an acetoacetylaminobenzene wherein any substituent on the benzene nucleus is selected from the group consisting of hydrogen, chlorine, bromine, fluorine, methyl, ethyl, methoxy, ethoxy, acetylamino, benzoylamino, carboxylic acid methylester, carboxylic acid ethyl ester, sulfonic acid amide, sulfonic acid phenylamide, nitro, cyano, trifluoromethyl, methylsulfonyl and ethylsulfonyl.

4. The water-insoluble dye of the formula

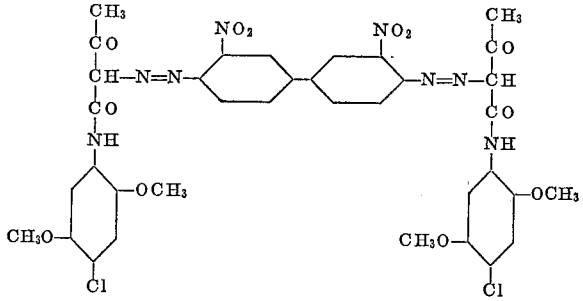

5. The water-insoluble dye of the formula
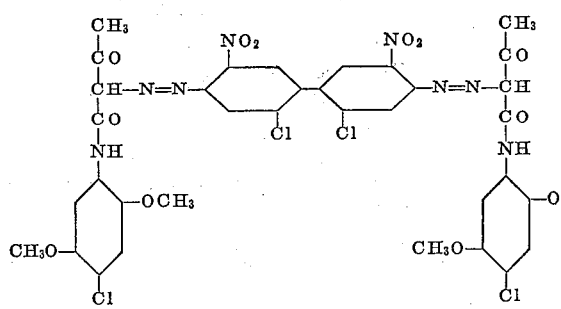
References Cited by the Examiner
UNITED STATES PATENTS
1,776,801  9/1930  Baddiley et al. _____ 260—181
FOREIGN PATENTS
229,029  11/1910  Germany.
326,552  2/1958  Switzerland.
OTHER REFERENCES
Lubs, H. A.: Chemistry of Synthetic Dyes and Pigments (1955) pages 182, 183.
Venkataraman, K.: The Chemistry of Synthetic Dyes (1952), volume I, pages 686, 650, 651, 701–704.
CHARLES B. PARKER, *Primary Examiner.*